US012565302B2

(12) United States Patent
Ockert

(10) Patent No.: US 12,565,302 B2
(45) Date of Patent: Mar. 3, 2026

(54) INTERIOR MODULE WITH A COMPRESSIBLE SIDE EDGE AND METHOD OF PRODUCING AN INTERIOR MODULE

(71) Applicant: Airbus Operations GmbH, Hamburg (DE)

(72) Inventor: Tatjana Ockert, Hamburg (DE)

(73) Assignee: Airbus Operations GmbH, Hamburg (DE)

(*) Notice: Subject to any disclaimer, the term of this patent is extended or adjusted under 35 U.S.C. 154(b) by 0 days.

(21) Appl. No.: 18/657,095

(22) Filed: May 7, 2024

(65) Prior Publication Data

US 2024/0375760 A1      Nov. 14, 2024

(30) Foreign Application Priority Data

May 12, 2023      (EP) ..................................... 23173009

(51) Int. Cl.
B64C 1/06              (2006.01)
(52) U.S. Cl.
CPC ..................................... B64C 1/066 (2013.01)
(58) Field of Classification Search
CPC ............................ B64D 11/0647; B64C 1/066
See application file for complete search history.

(56) References Cited

U.S. PATENT DOCUMENTS

| | | | | |
|---|---|---|---|---|
| 2020/0378167 A1* | 12/2020 | Brown | ...................... | E05F 1/063 |
| 2021/0039809 A1* | 2/2021 | Brown | ...................... | B64F 1/005 |
| 2021/0387734 A1* | 12/2021 | Rao | ........................ | B33Y 40/20 |
| 2022/0411068 A1* | 12/2022 | Weng | .................... | B64C 1/1461 |

FOREIGN PATENT DOCUMENTS

EP            3922559 A1      12/2021

OTHER PUBLICATIONS

European Search Report for corresponding European Patent Application No. 23173009.4 dated Oct. 30, 2023.

* cited by examiner

*Primary Examiner* — Tye William Abell
(74) *Attorney, Agent, or Firm* — Greer, Burns & Crain, Ltd.

(57)              ABSTRACT

An interior component for a passenger cabin. The interior component comprises a plate, which itself comprises a rigid section, and a compressible section. The rigid section and the compressible section form an integral body, and the compressible section is arranged at an end or side of the plate. Also an aircraft having such interior component and a method of manufacturing such interior component using additive manufacturing.

13 Claims, 7 Drawing Sheets

INTERIOR MODULE WITH A COMPRESSIBLE SIDE EDGE AND METHOD OF PRODUCING AN INTERIOR MODULE

CROSS-REFERENCES TO RELATED APPLICATIONS

This application claims the benefit of European Patent Application Number 23 173 009.4 filed on May 12, 2023, the entire disclosure of which is incorporated herein by way of reference.

FIELD OF THE INVENTION

The present disclosure generally relates to an interior component for a passenger cabin, an aircraft and a method of producing an interior component. Particularly, the present disclosure relates to an interior component comprising a plate with a rigid section and a compressible section arranged at an end or side of the plate forming an integrated seal. The present disclosure further relates to an aircraft having such interior component, and a method of producing such interior component employing an additive manufacturing process.

BACKGROUND OF THE INVENTION

Vehicles for passengers, such as aircrafts, buses, trains, and the like, comprise interior components, such as monuments, linings, sidewalls, storage bins, covers, and the like. These interior components are usually arranged next to one another, hence, forming a gap therebetween. For instance, the gaps can be intended to reach fixation means on a backside of the interior component or due to tolerances. These gaps are closed by soft and flexible seals, such as a rubber seal pressed into the gap.

The vehicle's structure itself usually moves, for example, due to deflections and various dynamic aspects of the vehicle body. This sometimes leads to a seal partly becoming loose. On the other hand, passengers sometimes pull the seal, so that it gets out of the gap.

Thus, the interior of the passenger cabin may not have an appealing look, even after only a few uses of the vehicle.

SUMMARY OF THE INVENTION

It is therefore an object of the present disclosure to improve the interior components of the vehicle.

This object may be solved by the present invention as defined in one or more embodiments described herein. Preferred embodiments are also described herein.

According to a first aspect to better understand the present disclosure, an interior component for a passenger cabin comprises a plate, which comprises a rigid section and a compressible section. Particularly, the rigid section and the compressible section form an integral body, and the compressible section is arranged at an end or side of the plate. For instance, the compressible section can be arranged along an edge of the plate or on a surface of the plate.

Thus, the interior component provides a compressible portion at an end or side of the plate, which can function as an integrated seal or other soft portion of the interior component. In other words, if the interior component is placed next to another interior component or further fixed structure, the compressible section can contact the other interior component or fixed structure and can close any gap therebetween. This allows omission of any seals separately placed into gaps, and, hence, avoids the problem of the seal becoming loose.

The passenger cabin can be part of a vehicle, such as an aircraft, a bus, a train, a ship or the like. Furthermore, the interior component can be a galley, a lavatory, a closet, a partition wall, a bulkhead, a (overhead) storage bin, a lining, a pelmet, a cover, an end cap, a maintenance flap, an infill panel or any other interior cabin component installed in the passenger cabin and having an edge or similar end.

A rigid section in this disclosure means a more or less non-compressible section. For instance, the rigid section may be similar to a usual plate of an interior component, i.e., without the modification or addition of the compressible section, according the present disclosure. The rigid section at least fulfils the same functionality as a conventional interior component.

In an implementation variant, the rigid section can have a first Shore hardness and the compressible section can have a second Shore hardness. The second Shore hardness indicates a higher compressibility. Optionally, the compressible section can be flexible, i.e., bounces back to its original form after a deflection. The different Shore hardnesses provide for a statically stable and rigid plate, particularly in the rigid section, and for an integrated seal in form of the compressible section. In other words, the compressible section adapts to any outer circumstances, such as another interior component, a structural component of the vehicle or the like, to which the compressible section is pressed, while forming a one-piece body with the rigid section.

For example, during installation, the interior component can be placed in such a manner that the compressible section (along its entire length and/or width) touches another component and/or element and adapts its form to the outer circumstances. Therefore, any gap between the interior component and the surroundings is closed by the plate itself, particularly by the compressible section.

Optionally, the compressible section may only be arranged in areas that will be visible by passengers in the passenger cabin.

In a further implementation variant, the rigid section and the compressible section can be homogeneously made from the same material. Thus, the plate is not only easy to manufacture. It is further possible to increase sustainability, by easy recycling of the plate being of the same material. Furthermore, the visible appearance (color, surface haptic, and the like) can be the same throughout the entire plate, including the rigid and compressible sections.

In another implementation variant, the compressible section can comprise geometric structures achieving a compressibility of the compressible section. For instance, the rigid section and the compressible section can have different geometric structures and/or forms that achieve different Shore hardnesses, i.e. respectively achieve a different compressibility.

As a mere example, the rigid section can be rigid and statically fix in all dimensions, such as a full block of the material or a honeycomb sandwich plate is. The compressible section, on the other hand, comprises geometric structures that can be compressed, bent or otherwise deflected, so that the entire compressible section can compress and/or flex.

In an implementation variant, the geometric structures can include at least one of a plate, a bar, a sphere, a ball, a tetrahedron, a pre-folded geometric structure, and a cube. The pre-folded geometric structure can be a bar, strut, plate, curved two-dimensional form or the like. Each of these geometric structures have different static parameters, particularly with respect to bending, kinking, and/or compression. This allows achieving a predefined compressibility of the compressible section.

In a further implementation variant, a size of a first geometric structure in at least one dimension can be different from a second geometric structure, wherein the first and second geometric structures are spaced apart from one another in at least one direction of the plate. Due to the different sizes the static parameters of the geometric structures change. Thus, the compressible section can have different compressibility capabilities along the at least one direction of the plate.

As a mere example, the geometric structures at an end of the plate (i.e., at an end of the compressible section) may be thinner, longer, smaller, etc., so that they are less rigid, i.e., more compressible. The geometric structures closer to a center of the plate (but still in the compressible section) may be thicker, shorter, bigger, etc., so that the plurality of geometric structures becomes more and more rigid. Thus, the end of the plate may have the capability of better adapting to the surrounding elements (e.g., may have a Shore hardness indicating the softest part), while the compressible section becomes more and more rigid towards the rigid section of the plate. As a mere example, a gradual change of Shore hardness (a gradual change of rigidity) may be provided in the compressible section, until it reaches the Shore hardness/rigidity of the rigid section.

In yet a further implementation variant, the compressible section can comprise one or more voids and/or one or more channels. These voids and/or channels allow the plate material in the compressible section, such as the geometric structures, to move (bend, kink, compress, etc.). Thus, compressibility is achieved.

In a further implementation variant, the compressible section can comprise a fabric, a textile or fibers. As a mere example, such fabric, textile, or fibers can cover and/or fill the voids and/or channels, and/or can cover at least regions of the compressible section, and/or can cover the entire compressible section and/or the entire plate. Thus, the compressible section is still opaque, so that anything behind the plate is not visible. The fabric, textile, or fibers is considered to be soft enough to not hinder the compressibility of the compressible section.

In another implementation variant, the compressible section can be more compressible in at least one direction than in at least one orthogonal direction. As a mere example, a plate usually has one dimension that is much smaller than two other dimensions (e.g., the thickness of the plate being smaller than the length and width of the plate). It may be desired that the compressible section is more rigid orthogonal to the plate, i.e., in the thickness direction of the plate. This allows deformation of the plate (i.e., the compressible section) in case of a force acting on the plate in the length and/or width direction, but hinders or avoids deformation of the plate in the thickness direction. This allows the entire plate to have a continuous look, particularly a continuous/plane surface.

In yet another implementation variant, the more compressible direction can be parallel to a plane defined by the plate. In other words, the compressible section is compressible in a direction orthogonal to the thickness direction. For instance, if the compressible section is intended to be pressed against other components and elements in the passenger cabin along a height/edge of the plate (the plate being vertically placed in the passenger cabin), the compressible section can have the most compressible capability in a horizontal direction towards the center of the plate.

In a further implementation variant, the compressible section can have a plurality of regions, wherein each region has a Shore hardness being different from at least one of the remaining regions. In other words, the compressible section can be divided into different regions, at least some of which have a mutually different Shore hardness.

In yet a further implementation variant, the compressible section can comprise a translucent material or a semi-transparent material. This allows illuminating the compressible section and, hence, achieving an illuminating effect at the end or side of the plate. As a mere example, a light emitting component is arranged close to or inside of the compressible section, so that light emits into the material of the compressible section and illuminates the compressible section (at least in particular regions). In case of voids or channels being present in the compressible section, the light distribution can be influenced by the voids or channels, which further allows achieving particular illuminating effects.

According to a second aspect to better understand the present disclosure, a vehicle comprises at least one interior component, according to the first aspect or one of its variants or examples. For example, the vehicle can be an aircraft, a bus, a train, a ship or other passenger carrying vehicle.

According to a third aspect to better understand the present disclosure, a method for producing an interior component, according to the first aspect or one of its variants or examples, comprises providing a basic material for the plate of the interior component, and manufacturing the plate from the basic material in an additive manufacturing process.

In other words, the additive manufacturing process uses the basic material to form the plate including the rigid section and the integrated compressible section. The additive manufacturing process can use melting, sintering or other ways of binding the basic material, thereby forming the entire plate. This allows to form the plate differently in the compressible section than in the rigid section. As a mere example, an additive layer manufacturing process can be employed to produce the interior component layer by layer.

The basic material can be a plastic material, such as from the group of (engineering) thermal plastics (TPU), thermoplastic elastomers (TPE), silicones, or (permanently) elastic synthetic resins.

In an implementation variant, the manufacturing process can include producing geometric structures and/or one or more voids and/or one or more channels in the area forming the compressible section during the additive manufacturing process. For instance, the geometric structures can be formed according to the additive (layer) manufacturing technique, while the voids and/or channels are formed by not binding the basic material (to a previous layer).

Alternatively or additionally, the manufacturing process can include producing the plate from a first material in the rigid section and from a second material in the compressible section, wherein the first material and the second material are different materials.

As a mere example, the first and second materials can have a different Shore hardness.

For instance, the first basic material for the rigid section can be a TPU or TPE, while the second basic material for the compressible section can be a silicone or a synthetic resin.

Likewise, the compressible section can optionally be made from the second basic material and additionally from a third basic material, which is different from the second material. It is to be understood that the number of materials employed for producing the interior component is not limited to the mentioned two or three materials.

According to a fourth aspect to better understand the present disclosure, a seal comprises at least two regions of different compressibility. For instance, such seal may have different parameters regarding compressibility in one or more regions of the seal, or may have different parameters regarding compressibility in one or more directions.

In an implementation variant, the seal can comprise a first region having a first Shore hardness and a second region having a second Shore hardness. The second Shore hardness indicates a higher compressibility. The different Shore hardnesses provide for an improved seal having a different capabilities regarding compressibility. In other words, the seal adapts to any outer circumstances, such as another interior component, a structural component of the vehicle or the like, to which the seal is pressed.

In a further implementation variant, the entire seal can be homogeneously made from the same material. Thus, the seal is not only easy to manufacture. It is further possible to increase sustainability, by easy recycling of the seal being of the same material. Furthermore, the visible appearance (color, surface haptic, and the like) can be the same throughout the entire seal, including the different compressible sections.

In another implementation variant, the seal can comprise geometric structures achieving the different compressibility parameters of the seal. For instance, a first region and a second region of the seal can have different geometric structures and/or forms that achieve different Shore hardnesses, i.e., respectively achieve a different compressibility.

As a mere example, the seal can comprise geometric structures that can be compressed, bent or otherwise deflected, so that the entire seal can compress and/or flex.

In an implementation variant, the geometric structures can include at least one of a plate, a bar, a sphere, a ball, a tetrahedron, a pre-folded geometric structure, and a cube. The pre-folded geometric structure can be a bar, strut, plate, curved two-dimensional form or the like. Each of these geometric structures have different static parameters, particularly with respect to bending, kinking, and/or compression. This allows achieving a predefined compressibility of each region of the seal.

In a further implementation variant, a size of a first geometric structure in at least one dimension can be different from a second geometric structure, wherein the first and second geometric structures are spaced apart from one another in at least one direction of the plate. Due to the different sizes the static parameters of the geometric structures change. Thus, the seal can have different compressibility capabilities along the at least one direction.

As a mere example, the geometric structures at one end or side of the seal may be thinner, longer, smaller, etc., so that they are less rigid, i.e., more compressible. The geometric structures closer to a center of the seal may be thicker, shorter, bigger, etc., so that the plurality of geometric structures becomes more and more rigid. Thus, the end or side of the seal may have the capability of better adapting to the surrounding elements (e.g., may have a Shore hardness indicating the softest part), while the seal becomes more and more rigid towards the center (or other most rigid region). As a mere example, a gradual change of Shore hardness (a gradual change of rigidity) may be provided in the seal, until it reaches the Shore hardness/rigidity of the center.

In yet a further implementation variant, the seal can comprise one or more voids and/or one or more channels. These voids and/or channels allow the seal material, such as the geometric structures, to move (bend, kink, compress, etc.). Thus, compressibility is achieved.

In a further implementation variant, the seal can comprise a fabric, a textile or fibers. As a mere example, such fabric, textile, or fibers can cover and/or fill the voids and/or channels, and/or can cover at least regions of the seal, and/or can cover the entire seal. Thus, the seal is still opaque, so that anything behind the seal is not visible. The fabric, textile, or fibers is considered to be soft enough to not hinder the compressibility of the seal.

In another implementation variant, the seal can be more compressible in at least one direction than in at least one orthogonal direction. As a mere example, a seal usually has one or two dimension that is much smaller than remaining dimension(s), e.g., the thickness and/or width of the seal being smaller than the length. It may be desired that the seal is more rigid in the thickness direction and/or the length direction. This allows deformation of the seal in case of a force acting on the seal in the width direction, but hinders or avoids deformation of the seal in the thickness direction. This allows the entire seal to have a continuous look, particularly a continuous/plane surface. The thickness direction is to be understood as a direction at which the seal can be visible, while the width direction is to be understood as a direction orthogonal to the thickness and the length direction, for example, the width direction may be a direction in which the seal is squeezed.

The present disclosure is not restricted to the aspects and variants in the described form and order. Specifically, the description of aspects and variants is not to be understood as a specific limiting grouping of features. It is to be understood that the present disclosure also covers combinations of the aspects and variants. Thus, each variant or optional feature can be combined with any other aspect, variant, optional feature or even combinations thereof.

BRIEF DESCRIPTION OF THE DRAWINGS

In the following, the present disclosure will further be described with reference to exemplary implementations illustrated in the figures, in which.

DETAILED DESCRIPTION OF THE
PREFERRED EMBODIMENTS

In the following description, for purposes of explanation and not limitation, specific details are set forth in order to provide a thorough understanding of the present disclosure. It will be apparent to one skilled in the art that the present disclosure may be practiced in other implementations that depart from these specific details.

Figure 1:
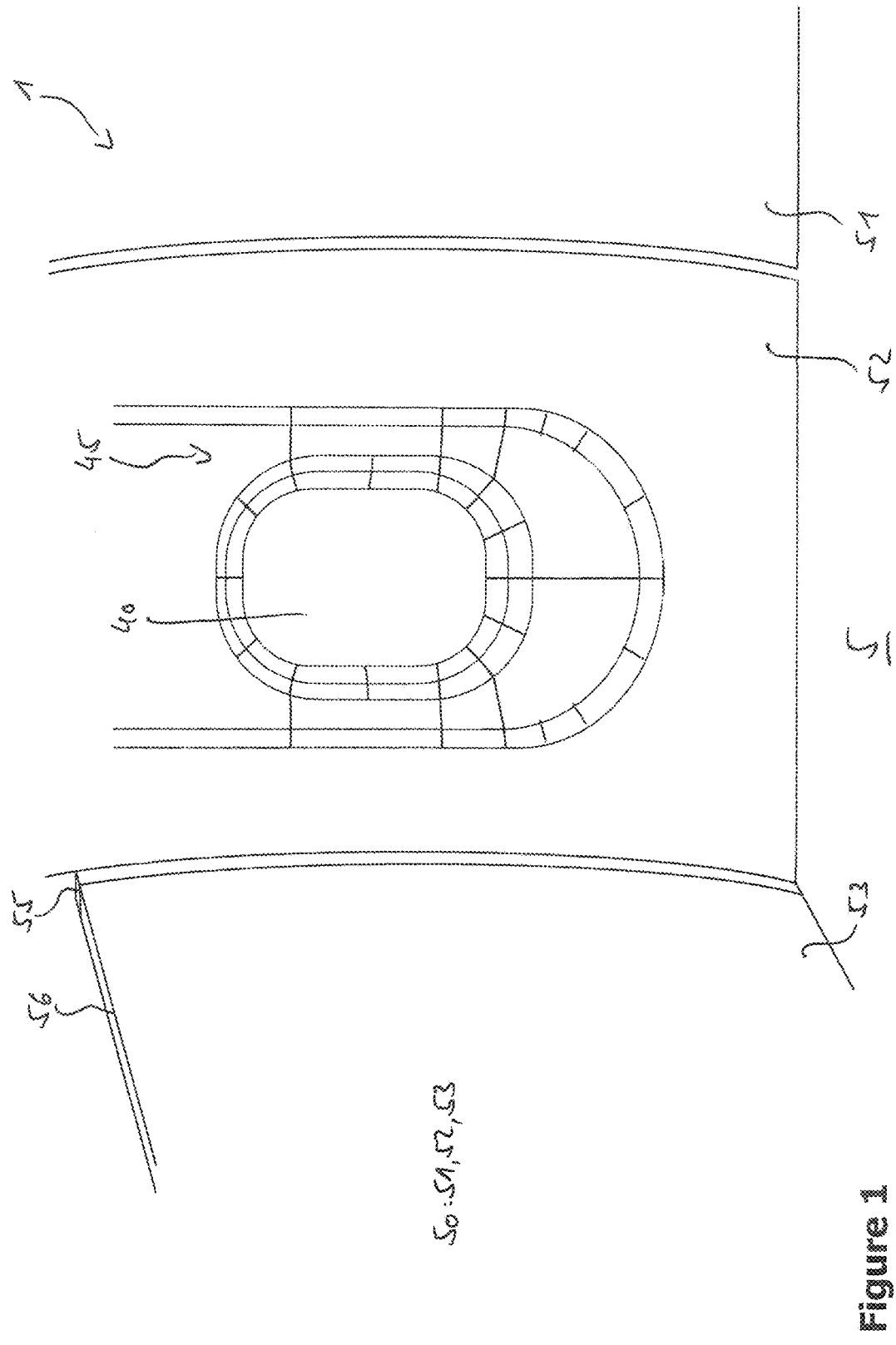
FIG. 1 schematically illustrates a portion of a passenger cabin.

FIG. 1 schematically illustrates a portion of a passenger cabin 5, which is exemplarily illustrated as a passenger cabin 5 of an aircraft 1, but can be in any other vehicle. This exemplary portion shows a plurality of interior components of the passenger cabin 5. Specifically, the illustrated exemplary interior components are a sidewall 51, an adjacent sidewall 52 including a window casing 45 around a window 40 of the vehicle 1 that comprises this passenger cabin 5.

In addition, a monument 53 is arranged in the passenger cabin 5. The monument 53 is exemplarily illustrated as a wall. This wall can be part of a cubic monument, such as a lavatory, galley, closet or the like, or can be simply a partition wall or bulkhead or the like.

Likewise, the sidewalls 51, 52 can be contemplated as forming a wall, although this wall is curved due to the substantially cylindrical form of the illustrated aircraft 1. All these walls of the sidewall 51, adjacent sidewall 52 and monument 53 are together referred to as a plate 50 of the interior component in this disclosure.

It is to be understood that any other interior component or element in the passenger cabin 5 can be equipped with a wall or plate 50 having the novel functionality explained in this disclosure.

For instance, the plate 50 of the monument 53 comprises a rigid section 56 and a compressible section 55. The compressible section 55 is arranged at an end of the plate 50. The "end" of the plate 50 means a portion of the plate 50 that delimits the monument 53 and will be arranged close to or in contact with another interior component, such as the sidewall 52. As a mere example, if the larger lateral surface of the plate 50 (facing the passenger cabin 5 and visible in FIG. 1) would be in contact with another component or element in the passenger cabin 5, the entire larger lateral surface, i.e., the side of the plate 50, can include the compressible section 55.

Figures 2, 3:
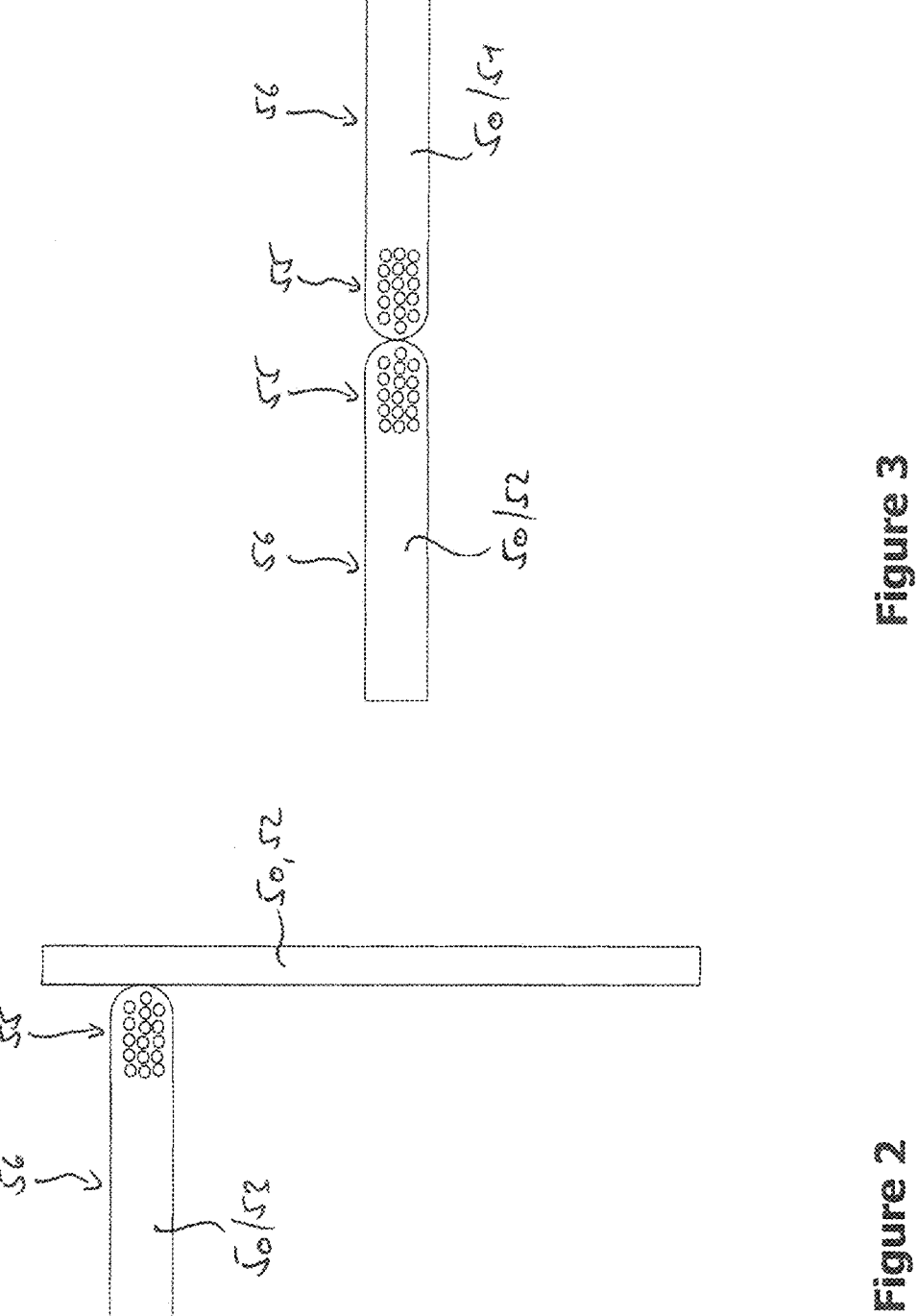
FIG. 2 schematically illustrates an exemplary joint of interior components.
FIG. 3 schematically illustrates another exemplary joint of interior components.

FIG. 2 schematically illustrates a cross-section of an exemplary joint of interior components, for example, two plates 50 of different interior components. FIG. 2 schematically illustrates an exemplary joint as the monument wall 53 with the sidewall 52 of FIG. 1.

As can be derived from FIG. 2, the plate 50 of the monument 53 has a rigid section 56 and a compressible section 55 at an end of the plate 50. The rigid section 56 and the compressible section 55 form and integral body. Thus, from the outside the plate 50 can look the same in the rigid section 56 and the compressible section 55, can have the same thickness (up-down direction in FIG. 2), can be homogeneously of the same material, etc.

The compressible section 55 is only schematically illustrated as voids (bubbles) in the material of the plate 50. Different exemplary ways of forming the compressible section 55 will be explained with respect to FIGS. 4 to 7. This compressible section 55 forms an integral seal in the plate 50, as both plates 50 can move relative to one another, thereby deforming the compressible section 55, i.e. compressing and releasing the compressible section 55.

It is to be understood that in case of maintenance, the compressible section 55 may be removed and replaced by a seal (not explicitly illustrated) having the same structure, parameters and capabilities as the compressible section.

FIG. 3 schematically illustrates a cross-section of another exemplary joint of interior components, for example, two plates 50 of different interior components. As a mere example, the interior components can be a first sidewall 51 and a second sidewall 52 contacting one another at their respective ends/edges (as the sidewalls 51, 52 in FIG. 1).

Each of the sidewalls 51, 52 forms a plate 50 that has a rigid section 56 and a compressible section 55. Again, each compressible section 55 is only schematically illustrated as voids (bubbles) in the material of each of the plates 50. The compressible sections 55 form an integral seal in each plate 50, as both plates 50 can move relative to one another, thereby deforming one or both of the compressible sections 55, i.e., compressing and releasing the respective compressible section 55.

It is to be understood that any interior component can be provided with such compressible section 55, so that it has an integral seal closing any gap to another component or element in the passenger cabin 5 or the vehicle 1.

Furthermore, the plates 50 illustrated in FIG. 3 can be formed as the plates 50 in FIG. 2, i.e. only one plate 50 is provided with a compressible section 55, while the other plate 50 has a rigid side contacting the compressible section 55.

Figure 4:
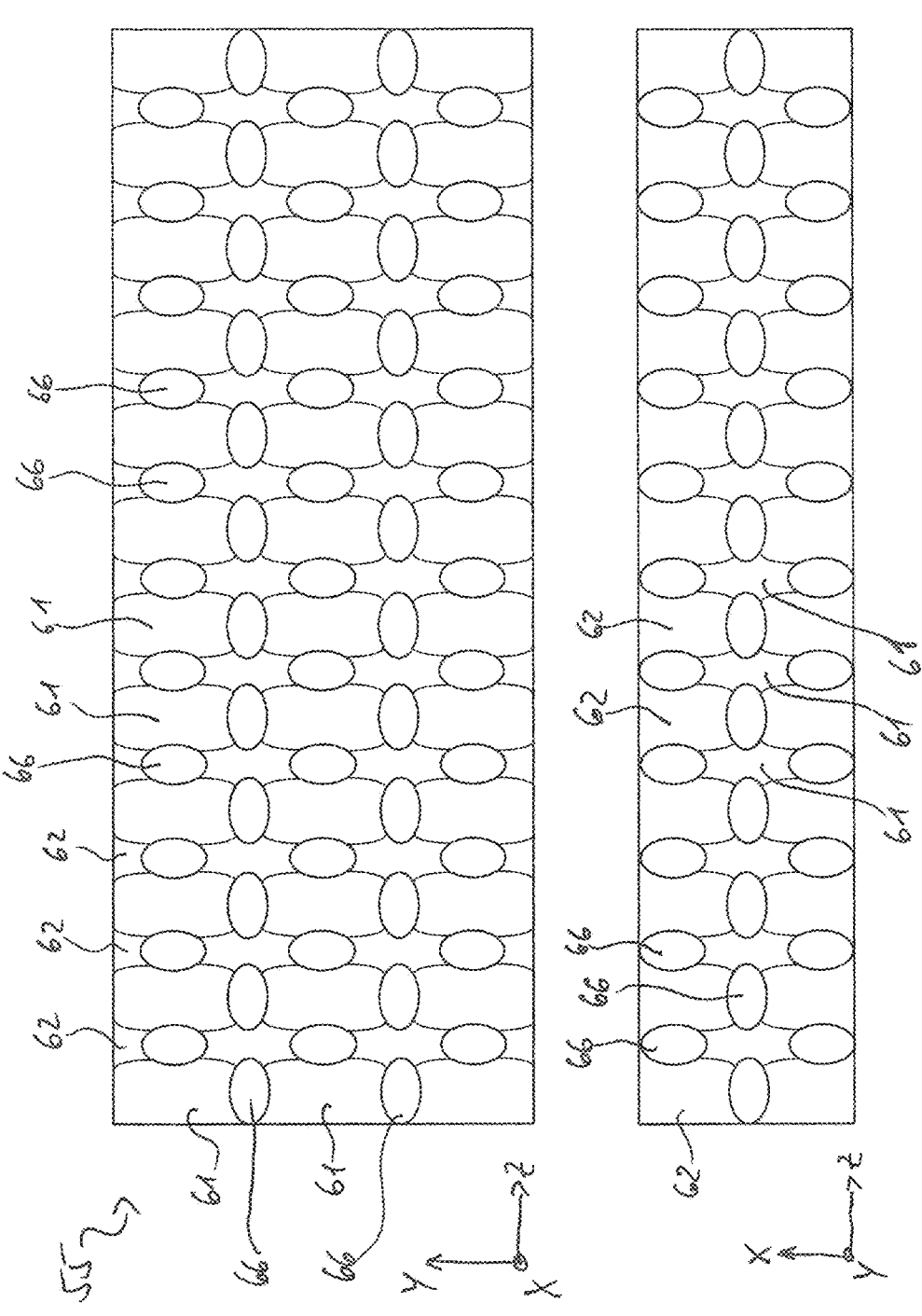
FIG. 4 schematically illustrates a front view and a top view of an exemplary compressible section of an interior component.

FIG. 4 schematically illustrates a front view and a top view of an exemplary compressible section 55 of an interior component, such as a plate 50. Although the compressible section 55 is illustrated as having a greater width than height, it is to be understood that this is only one example. For instance, such compressible section 55 can be turned in any direction to form a seal along a gap to another component or element. For instance, FIG. 4 illustrates a coordinate system (X-, Y-, Z-axis), which can correspond to the usual coordinate system of the vehicle, such as an aircraft 1, where the X-axis corresponds to the longitudinal direction of the aircraft 1, the Y-axis corresponds to a horizontal cross-sectional direction, and the Z-axis corresponds to a vertical cross-sectional direction of the aircraft 1.

The compressible section 55 of FIG. 4 comprises a plurality of geometric structures, such as a plurality of plates 61 or bars 62. It is to be understood that the bars 62 can likewise be plates 61 turned by 90° around the Z-axis and turned by 90° around the X-axis. Moreover, a plurality of voids or channels 66 are arranged between the plates 61 or bars 62.

It is to be understood that the plates 61 and bars 62 are only exemplary geometric structures. The compressible section 55 can additionally or alternatively include one or more struts, one or more columns, one or more spheres, one or more balls, one or more tetrahedrons, one or more cubes, etc.

Furthermore, since the voids and channels could allow to see behind the plate 50, the compressible section 55 could further include one or more of fibers, fabric, textile or the like. Such fibers, fabric, textile or the like is usually soft enough, in order to do not hinder the compressibility of the compressible section 55, but blocks any sight through the compressible section 55. The fibers, fabric, textile or the like can be arranged on an outer surface of the compressible section 55 and/or can be arranged in the voids and/or channels 66. It is to be understood that the fibers, fabric, textile or the like can also be arranged on an outer surface of the rigid section 56 and/or on the entire plate 50.

In any case, if a force is applied to an end or side of the compressible section 55, the geometric structures can move, bend, kink or otherwise give way. In other words, the compressible section 55 can be compressed due to the geometric structures 61, 62 and/or due the plurality of voids or channels 66. It is to be understood that the compressible section 55 can also be flexible, i.e., if the force is not applied to the compressible section 55 anymore, the compressible section 55 achieves its original form.

The geometric structures 61, 62 can be made of the same material as the rigid section 56 of the plate 50, so that a homogeneous plate 50 can be formed having a compressible section 55 at its end or side. In other words, the compressible section 55 has a different Shore hardness than the rigid section 56, by which the compressible section 55 forms a seal to close any gap at the end of the plate 50.

The geometric structures 61, 62 can be made in an additive layer manufacturing process, wherein a basic material is melted, sintered or otherwise binding together in the areas forming the geometric structures 61, 62. The voids or channels 66 can simply be formed by not melting, sintering or otherwise binding together the basic material, and optionally removing the basic material later on.

Figure 5:
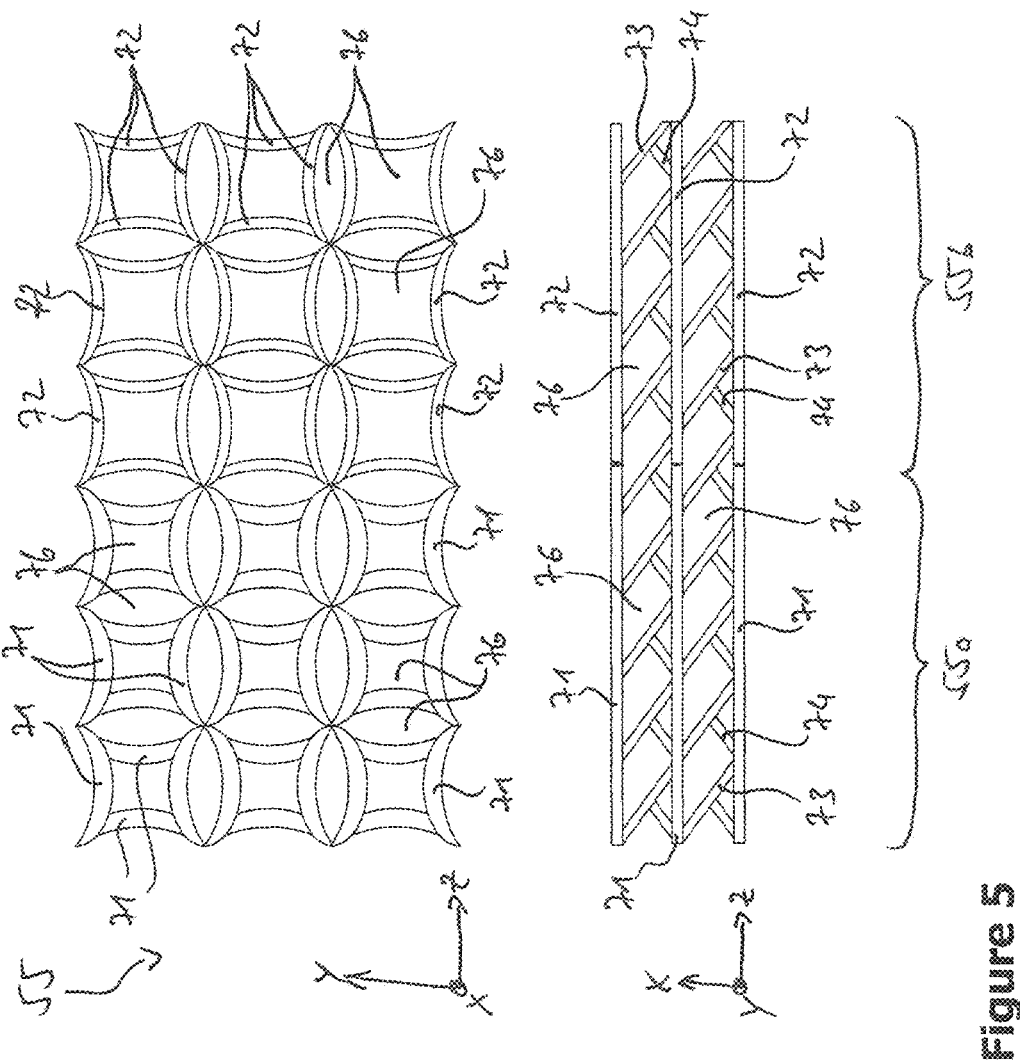
FIG. 5 schematically illustrates a front view and a top view of another exemplary compressible section of an interior component.

FIG. 5 schematically illustrates a front view and a top view of another exemplary compressible section 55 of an interior component, such as a plate 50. The compressible section 55 can be made in the same way, with the same materials as described with respect to FIG. 4, so that the corresponding explanations are omitted for sake of brevity.

The compressible section 55 of FIG. 5 is formed of a plurality of bars 71, 72, 73, 74. Again, voids or channels 76 are arranged between the geometric structures 71, 72, 73, 74.

The geometric structures 71, 72, 73, 74 of FIG. 5 are arranged and formed in such a manner, that the compressible section 55 is more compressible in at least one direction than in at least one orthogonal direction.

For instance, the bars 72 are of a smaller size in at least one dimension than the bars 71. The smaller dimension can be a width and thickness of the bar 72, while a length of the bar 72 corresponds to the length of the bar 71. Thus, the bars 72 are less rigid and, hence, can easier be bent, deformed, can easily kink, etc. The area of the compressible section 55 having the bars 71 is adjacent to or spaced apart from the area of the compressible section 55 having the smaller bars 72. This allows providing the compressible section 55 with a different compressibility along one direction, here along the Z-axis.

Turning to the top view in FIG. 5, the arrangement of bars 73, 74 further allows to have a different compressibility in the X-axis direction than in the other directions (Y- and Z-axis. As a mere example, the shorter bars 74 support the longer bars 73 only in one direction, so that the "upper" part (in FIG. 5) of the longer bars 73 can bend "downwards", but are more rigid (resistant to compression) in the Z-axis direction.

Figure 6:
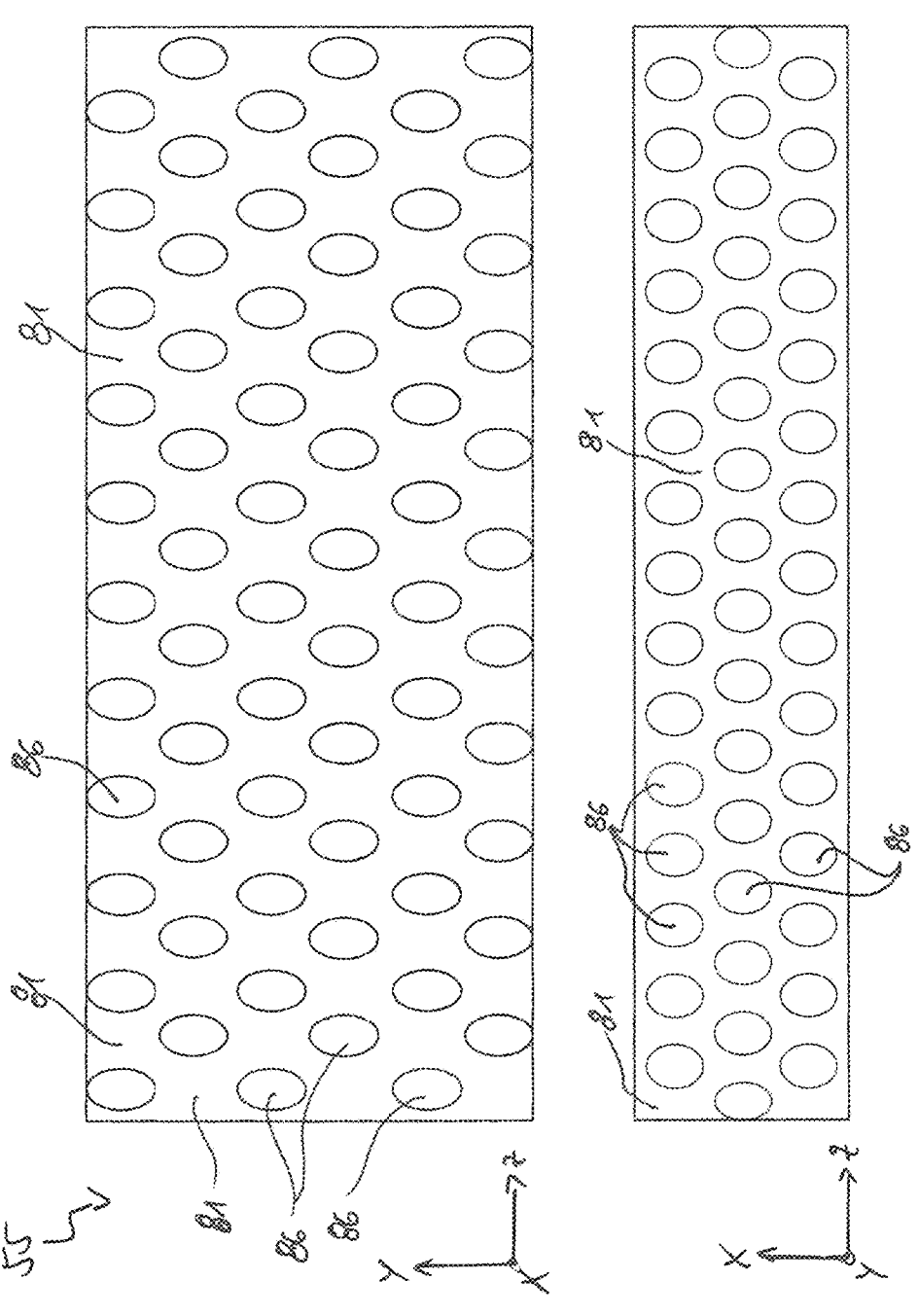
FIG. 6 schematically illustrates a front view and a top view of a further exemplary compressible section of an interior component.

FIG. 6 schematically illustrates a front view and a top view of a further exemplary compressible section 55 of an interior component, such as a plate 50. In this example, the compressible section 55 is formed by a "sponge"-like structure comprising a plurality of voids 86 (or bubbles). The geometric structure 81 can be compared to a homogeneous material surrounding the voids 86.

While such compressible section 55 may have the same compressibility parameters in each direction, the form or shape of the voids 86 can be employed to change the compressibility parameter in at least one direction. As a mere example, FIG. 6 illustrates voids 86 that have elliptical cross-sectional shapes with a greater length in the Y-axis direction and the X-axis direction than in the Z-axis direction.

It is to be understood that the geometric structures illustrated in FIGS. 4 to 6 are only exemplary, and that any other form of the geometric structures, and/or any other type of connection of such geometric structures can be employed to achieve different compressibility characteristics of the compressible section 55 in one or more directions than in the remaining directions.

Figure 7:
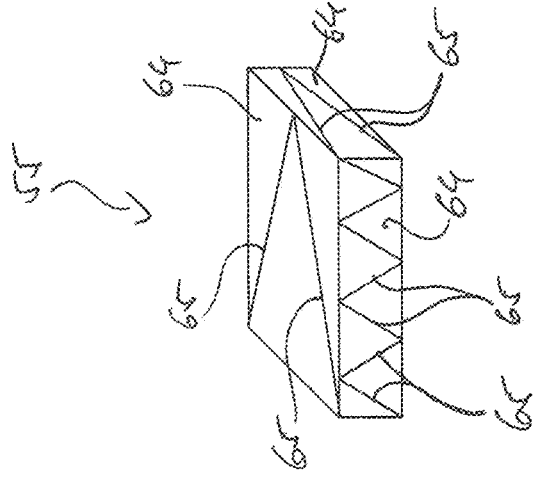
FIG. 7 schematically illustrates a perspective view of geometric structures forming an exemplary compressible section.
Figure 7:
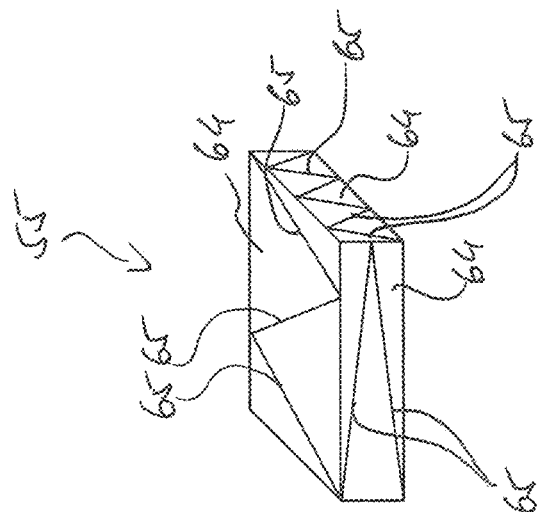

FIG. 7 schematically illustrates geometric structures of an exemplary compressible section 55. These geometric structures include a plurality of pre-folded geometric structures 64. It is to be understood that the plate-like shape in FIG. 7 is for illustrative purposes only, and that the pre-folded geometric structures 64 can include at least one bar, strut, plate, curved two-dimensional form or the like. The compressible section 55 comprises a plurality of pre-folded geometric structures 64 that form a three-dimensional body. It is to be understood that the illustrated cuboids are only one exemplary body formed from a plurality of geometric structures 64.

At least one of the geometric structures 64 can be pre-folded, illustrated as fold lines 65. If this body is affected by a force, the geometric structures 64 arranged parallel to this force will be compressed. Due to the fold lines 65, a certain compressibility can be achieved, i.e., a certain Shore hardness can be achieved in the direction of force. In other words, at each fold line 65 the geometric structure forms an elastic biasing element.

As can be seen from the two illustrated bodies, different fold lines 65 can be provided on the pre-folded geometric structures 64 (here plates 64), i.e., can be different in number, form, size, direction, et cetera). These different fold lines 65 provide for the different compressibility parameters in different directions.

In addition, each of the geometric structures 61, 62, 71, 72, 73, 74, 81 illustrated in FIGS. 4 to 6 can be pre-folded. In other words, each of the geometric structures 61, 62, 71, 72, 73, 74, 81 of FIGS. 4 to 6 can be a pre-folded geometric structure 64 as illustrated in and described with respect to FIG. 7. By having fold lines 65, each of the geometric structures 61, 62, 71, 72, 73, 74, 81 can be provided with a particular compressibility parameter.

Figure 8:
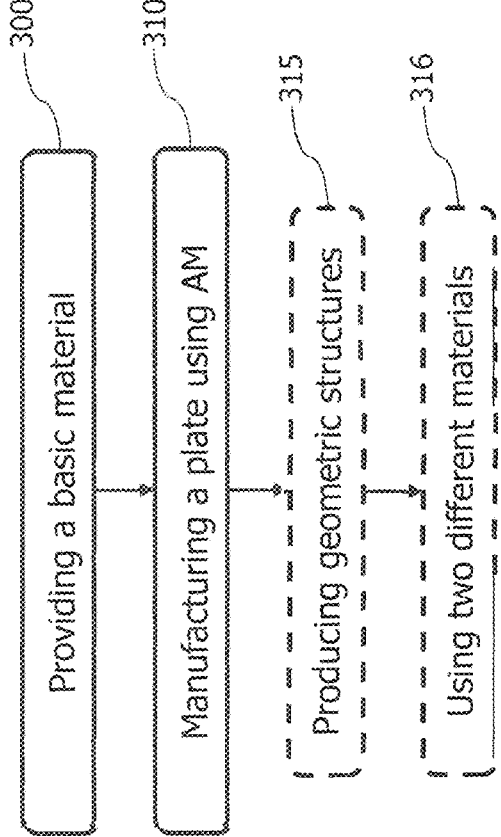
FIG. 8 illustrates a flow diagram of a method for producing an interior component.

FIG. 8 illustrates a flow diagram of a method for producing an interior component, such as a plate 50 having a rigid section 56 and a compressible section 55.

The method begins at step 300 by providing a basic material for the plate 50. The basic material can be a powder, liquid, gel or the like. The basic material can be or contain a thermoplastic (TPU), a thermoplastic elastomer (TPE), a silicone, a resin, an elastic synthetic resin or the like.

Furthermore, in step 310, the plate 50 is manufactured from the basic material in an additive manufacturing process. Such additive manufacturing (AM) can be a conventional technique employing melting, sintering, curing, hardening, etc., the basic material layer by layer to form the geometric structures 61, 62, 71, 72, 73, 74, 81 of the plate 50.

For instance, the (ALM) manufacturing can comprise a step 315 of producing geometric structures 61, 62, 64, 71, 72, 73, 74, 81 by melting, sintering, curing, hardening, etc. the basic material. Likewise, the (AM) manufacturing can produce one or more voids and/or channels 66, 76, 86 next to the geometric structures 61, 62, 64, 71, 72, 73, 74, 81 by not connecting the basic material. Eventually, the basic material has to be removed from the voids and/or channels 66, 76, 86.

Additionally or alternatively, the (AM) manufacturing can comprise a step 316 of producing the plate 50 from a first material in the rigid section 56 and from a second material in the compressible section 55. The first and second materials are different materials, for example, materials having a different Shore hardness.

It is believed that the advantages of the technique presented herein will be fully understood from the foregoing description, and it will be apparent that various changes may be made in the form, constructions and arrangement of the exemplary aspects thereof without departing from the scope of the disclosure or without sacrificing all of its advantageous effects. Because the technique presented herein can be varied in many ways, it will be recognized that the disclosure should be limited only by the scope of the claims that follow.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An interior component for a passenger cabin, the interior component comprising:
a plate, wherein the plate comprises:
a rigid section, and
a compressible section,
wherein the rigid section and the compressible section form an integral body, and
wherein the compressible section is arranged along an edge or on a surface of the plate and comprises geometric structures in form of pre-folded plates, each of the pre-folded plates being pre-folded along fold lines and achieving a compressibility of the compressible section.

2. The interior component of claim 1, wherein the rigid section has a first Shore hardness and the compressible section has a second Shore hardness, the second Shore hardness indicating a higher compressibility, or
wherein the compressible section is flexible, or both.

3. The interior component of claim 1, wherein the rigid section and the compressible section are homogeneously made from the same material.

4. The interior component of claim 1, wherein the compressible section comprises one or more voids, or one or more channels, or both.

5. The interior component of claim 1, wherein the compressible section has a plurality of regions, each region having a Shore hardness being different from at least one of the other regions.

6. The interior component of claim 1, wherein a size of a first geometric structure in at least one dimension is different from a second geometric structure.

7. The interior component of claim 6, wherein the first and second geometric structures are spaced apart from one another in at least one direction of the plate.

8. The interior component of claim 1, wherein the compressible section is more compressible in at least one first direction than in at least one orthogonal direction.

9. The interior component of claim 8, wherein, the at least one first direction is parallel to a plane defined by the plate.

10. An aircraft comprising:
the interior component of claim 1.

11. A method for producing an interior component, the interior component comprising a plate, wherein the plate comprises a rigid section and a compressible section, wherein the rigid section and the compressible section form an integral body, and wherein the compressible section is arranged along an edge or on a surface of the plate, the method comprising:
providing at least one basic material for the plate of the interior component; and
manufacturing the plate from the at least one basic material in an additive manufacturing process, and
producing geometric structures during the additive manufacturing process wherein the compressible section comprises the geometric structures in form of pre-folded plates, each of the pre-folded plates being pre-folded along fold lines and achieving a compressibility of the compressible section.

12. The method of claim 11, wherein the step of providing the at least one basic material includes providing a first basic material and a second basic material and wherein the manufacturing the plate comprises:
producing the plate from the first basic material in the rigid section and from the second basic material in the compressible section, wherein the first basic material and the second basic material are different materials.

13. The method of claim 11, wherein the step of providing the at least one basic material includes providing a first basic material and a second basic material and wherein the manufacturing the plate comprises producing the plate from the first basic material in the rigid section and from the second basic material in the compressible section, wherein the first basic material and the second basic material are different materials having different Shore hardnesses.

* * * * *